US006211908B1

(12) United States Patent
Griepentrog

(10) Patent No.: US 6,211,908 B1
(45) Date of Patent: Apr. 3, 2001

(54) TELEVISION APPARATUS WITH SUPPLEMENTARY KINESCOPE BLANKING AND SPOT BURN PROTECTION CIRCUITRY

(75) Inventor: Dal Frank Griepentrog, Indianapolis, IN (US)

(73) Assignee: Thomson multimedia Licensing S.A., Boulogne Cedex (FR)

(*) Notice: Subject to any disclaimer, the term of this patent is extended or adjusted under 35 U.S.C. 154(b) by 0 days.

(21) Appl. No.: 09/320,978

(22) Filed: May 27, 1999

(51) Int. Cl.[7] .............................. H04N 3/20; H04N 5/68; H04N 3/29
(52) U.S. Cl. ..................... 348/173; 348/173; 348/377; 348/378; 348/379; 348/805; 348/634; 315/380; 315/384; 315/381; 315/1
(58) Field of Search ................................ 348/377, 378, 348/379, 805, 634, 635, 637; 315/1, 381, 380, 384

(56) References Cited

U.S. PATENT DOCUMENTS

| 3,863,096 | * | 1/1975 | Sennik ................................. 315/20 |
| 4,217,525 | * | 8/1980 | Nakamura et al. ................. 315/381 |
| 4,237,479 | * | 12/1980 | Lavigne ............................... 358/33 |
| 4,263,622 | | 4/1981 | Hinn . |
| 4,390,817 | * | 6/1983 | Johnson .............................. 315/384 |
| 4,604,647 | * | 8/1986 | Peele .................................... 358/65 |
| 5,036,257 | | 7/1991 | Norman et al. . |
| 5,036,260 | | 7/1991 | George . |
| 5,043,639 | * | 8/1991 | Gurley et al. ....................... 315/384 |
| 5,084,657 | * | 1/1992 | Ueda .................................. 315/381 |
| 5,089,754 | | 2/1992 | George . |
| 5,130,615 | * | 7/1992 | George ............................... 315/381 |
| 5,184,225 | * | 2/1993 | Heidebroek et al. ............... 358/243 |
| 5,189,347 | * | 2/1993 | Ogino et al. ....................... 315/383 |
| 5,488,417 | * | 1/1996 | Grienpentrog ...................... 348/379 |
| 5,677,730 | * | 10/1997 | Park ................................... 348/173 |
| 5,682,083 | * | 10/1997 | Shin ...................................... 315/1 |
| 5,714,843 | * | 2/1998 | Youn ..................................... 315/1 |
| 5,856,730 | * | 1/1999 | George ............................... 315/386 |
| 5,903,111 | * | 5/1999 | Shin ................................... 315/381 |
| 5,920,339 | * | 7/1999 | Lee .................................... 348/173 |
| 5,994,852 | * | 11/1999 | Lee .................................... 315/408 |
| 6,034,729 | * | 3/2000 | Lim .................................... 348/377 |
| 6,046,552 | * | 4/2000 | Yoon .................................. 315/380 |

* cited by examiner

Primary Examiner—John Peng
Assistant Examiner—Paulos Natnael
(74) Attorney, Agent, or Firm—Joseph S. Tripoli; Robert D. Shedd

(57) ABSTRACT

Supplementary grid blanking and spot burn protection are provided in a receiver/monitor (10) by a grid bias control circuit (50) including a blanking signal generator (60) that produces a blanking output signal (S1) devoid of any picture representative component whenever a vertical blanking signal (VB) or a horizontal blanking signal (HB) is present. A capacitor (C1) strips DC from the blanking signal and the resultant signal (S2) is applied to a modulation input (84) of a grid bias generator to produce an output grid bias reference voltage (Vr) modulated by the AC component of the blanking signal. The reference voltage (Vr) is coupled via a spot burn protection circuit (100) and a grid coupling circuit (120) to the control grids of three projection kinescopes (16, 18, 20). Distortions which may tend to appear in the grid blanking pulses are corrected by a high frequency correction circuit (140) coupled between an output (66) of the composite blanking generator (60) and an input (122) of the grid coupling circuit (120).

7 Claims, 3 Drawing Sheets

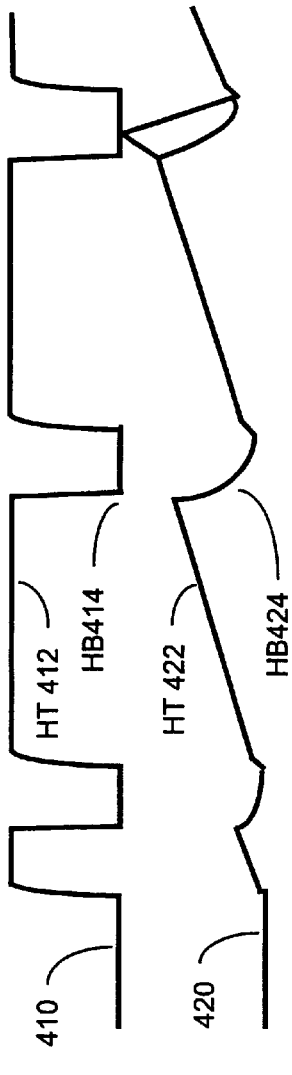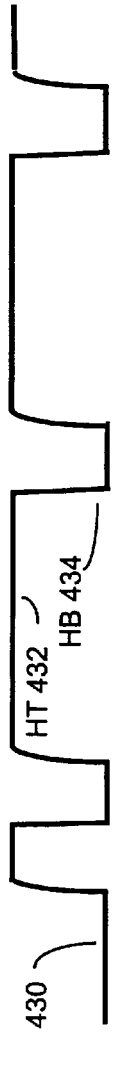

TELEVISION APPARATUS WITH SUPPLEMENTARY KINESCOPE BLANKING AND SPOT BURN PROTECTION CIRCUITRY

FIELD OF THE INVENTION

This invention relates to television apparatus and particularly to improvements in television apparatus providing both spot burn protection and supplementary kinescope blanking.

BACKGROUND OF THE INVENTION

When a conventional television system is turned off (i.e., switched from "run" to "stand-by" operating modes) the collapse of the raster may concentrate the kinescope beam energy to a small spot and this may burn the kinescope phosphor. A known method of preventing such a "spot burn" is to detect the loss of sweep condition and apply a relatively high negative voltage to the control grid (grid "G1") of the kinescope of a sufficient value to cut off the electron beam. Kinescope beam cut-off voltages are typically on the order of minus two hundred volts or so relative to the cathode. Protection circuits of this type are generally known as "grid kick" protection circuits.

In more detail, in the "grid kick" method of spot burn protection, a charge storage device (e.g., a capacitor) is coupled to a control grid of the kinescope and is further coupled through a switching circuit to a relatively high voltage positive supply. The charge storage device is charged through the switching circuit by the high voltage supply during normal operation when scanning signals are present.

Upon scan loss, the switching circuit operates to ground the positive (+) capacitor plate so as to produce a high negative voltage at the other plate of the capacitor which is coupled to the control grid of the kinescope. In this manner, a sufficient voltage difference is maintained between the cathode and the control grid as the deflection or sweep signal collapses to reduce the beam current to zero and thus the kinescope screen is protected from phosphor burn.

An example of a "grid kick" type of spot burn protection circuit is described in U.S. Pat. No. 5,089,754 entitled PROTECTION CIRCUIT FOR A CATHODE RAY TUBE which issued Feb. 18, 1992 to John B. George. Another is described by Gurley et al. in U.S. Pat. No. 5,043,639 entitled VIDEO DISPLAY APPARATUS. WITH KINESCOPE SPOT BURN PROTECTION CIRCUIT which issued Aug. 27, 1991.

In television systems employing kinescopes as display devices, the video signals (e.g., R, G and B) to be displayed are typically amplified by respective high voltage kinescope driver amplifiers for application to respective ones of the kinescope cathodes. Typically, the required high voltage for the cathode driver amplifiers may be in a two to three hundred volt range. In the interest of improving the system power efficiency and reducing the voltage rating of driver amplifier components, it is generally desirable to reduce the overall high voltage requirements for the driver amplifiers.

A problem exists, however, when one contemplates reducing the high voltage for the cathode driver amplifiers. Specifically, a point may be reached in which the retrace blanking component of the video signal may be reduced by so much that beam retrace artifacts may appear in displayed images.

The root of this problem is that beam retrace blanking is the very first component of the cathode drive signal to suffer from reduced operating voltage. This is because the retrace signal (e.g., horizontal or vertical blanking) is the most positive component of the cathode drive signal. More specifically, the "picture" representative component occurs in a lower range of voltages with peak white being the lowest picture voltage level and with picture black occurring at an intermediate voltage level. Blanking components, such as horizontal and vertical blanking (being 40 IRE above black level, so called "blacker than black" components) occur at the maximum cathode drive voltage levels.

To overcome the problem of loss of retrace blanking as the high voltage for the cathode driver amplifiers is reduced, one might consider providing supplementary retrace blanking to the control grid (grid number "G1") of the kinescope.

An example of television apparatus with supplementary kinescope blanking is described by James C. Peele in U.S. Pat. No. 4,604,647 entitled CATHODE RAY TUBE DRIVER CIRCUIT which issued Aug. 5, 1986. A problem undertaken by Peele was to reduce the operating voltage requirements for individual semiconductor amplifiers used to amplify component video signals (R, G, B) for application to a kinescope.

In the Peele apparatus, a video signal is coupled to the cathode of a kinescope via a first driver amplifier that receives positive high voltage (+Vdc) from a positive power supply and produces a video output signal that is biased positive with respect to ground. The video signal is also coupled to the control grid of the kinescope by a second driver amplifier (of the inverting type). The second driver amplifier is provided with a negative high voltage supply (−Vdc) from a negative power supply and produces a complementary video output signal that is biased negatively with respect to ground. In total, the apparatus requires three cathode driver amplifiers and a positive high voltage supply and three grid driver amplifiers with a negative high voltage supply.

As a result of the unique topology of the Peele system, the cathode and grid electrodes are driven differentially by the video signals and so the effective grid-cathode drive voltage is twice the voltage produced by each of the high voltage driver amplifiers individually. This allows a reduction in the magnitudes of the positive (+Vdc) and negative (−Vdc) amplifier high voltage power supply voltages since each amplifier has to supply only one half of the drive voltage normally required for "single ended" (i.e., non-differential) kinescope driver amplifiers.

It is herein recognized that one problem with the Peele apparatus is that a pair of complementary high voltage power supplies are required to form each kinescope beam. The requirement for such dual positive and negative high voltage power supplies may greatly increase the cost and complexity of the receiver.

Another problem concerns matching the characteristics of the inverting and non-inverting amplifiers for the cathodes and grids. For maximum bandwidth, the amplifiers should have similar characteristics. Since the amplifiers operate with opposite polarity supply voltages and opposite polarity bias voltages, matching of the amplifier AC and DC characteristics may be difficult. For example, if the amplifiers are designed to be electrical complements of each other, it may be difficult to fine NPN and PNP transistors having well matched AC and DC characteristics. If, on the other hand, the amplifiers are identical but biased above and below ground, a further inverting amplifier may be required for inversion of the video signal applied to the grid driver amplifiers.

A further problem with the Peele apparatus relates to spot burn protection of the kinescope. Specifically, as discussed above, it is generally desirable in television display systems to protect the kinescope from spot burns upon occurrence of loss of scanning (deflection) signals as may occur, for example, upon turn off of the system. In the Peele apparatus, the need for three cathode driver amplifiers and three grid driver amplifiers (with complementary DC biasing) would indicate the need for multiple spot burn protection circuits, one for each cathode amplifier and one for each control grid amplifier, to provide beam cut-off in the event of scan loss. It would be desirable to avoid the complexity of six amplifiers.

SUMMARY OF THE INVENTION

It is a task of the present invention is to provide a video display system which overcomes the problems discussed above of the prior art apparatus.

Television apparatus embodying one aspect of the invention comprises a source coupled to provide a video signal to a cathode of a kinescope, coupled to provide a scanning signal to a yoke of the kinescope and having an output providing a scan loss indicating signal, the video signal including a picture representative component and a retrace blanking signal component during a retrace interval. A spot burn protection circuit, responsive to a first value of the scan loss indicating signal, applies a positive grid bias voltage to a control grid of the kinescope and responsive to a second value of the scan loss indicating signal applies a negative beam cut-off voltage to the control grid. Circuit means are provided for applying a blanking signal component during the retrace interval to the control grid of the kinescope via the spot burn protection circuit.

Television apparatus embodying another aspect of the invention includes a source coupled to provide a video signal to a cathode of a kinescope, the video signal including a picture representative component and a retrace blanking signal component during a retrace interval. Circuit means are provided for applying a retrace blanking signal component during the retrace interval, and devoid of any picture representative component, to a control grid of the kinescope.

BRIEF DESCRIPTION OF THE DRAWING

The foregoing and further features of the invention are illustrated in the accompanying drawing, where like elements are denoted by like reference designators, and in which:

FIGS. 3A–3C and 4A–4C are waveform diagrams illustrating operation of the apparatus of FIGS. 1 and 2.

DETAILED DESCRIPTION

Figure 1:
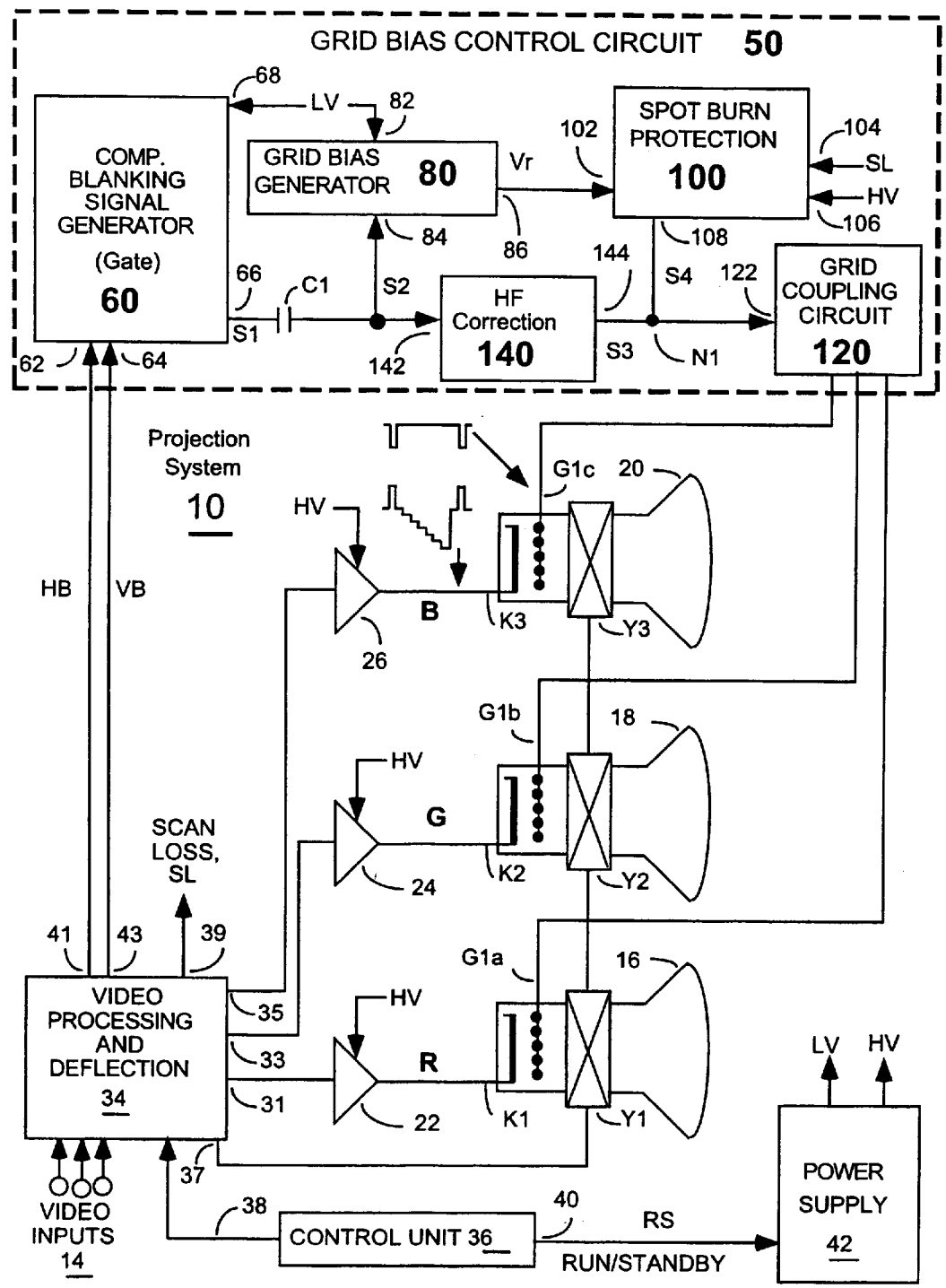
FIG. 1 is a simplified block diagram of television apparatus including a grid bias control circuit embodying the invention.

The television apparatus of FIG. 1 is useful in receiver/monitor applications and may be used with a single direct view kinescope or, as illustrated, it may be used with three kinescopes in a projection display application.

As a brief overview of some of the more salient features of the invention, spot burn protection with supplementary grid blanking in the present invention requires only a single grid bias control circuit (50) for the three grids. This is achieved, in part, by keeping active video away from the grids as will be described.

Projection system 10 of FIG. 1 comprises a video processing and deflection unit 34 having a plurality of video signal inputs 14 for receiving video signals to be displayed. Unit 12 may include a tuner (not shown) for tuning RF video input signals and includes suitable switching circuits for selecting between RF and baseband video input signals.

Unit 34 provides conventional video processing and deflection functions and has outputs 31, 33 and 35 coupled to supply respective red (R), blue (B) and green (G) baseband video signals that are coupled to respective cathodes (K1, K2, K3) of respective projection kinescopes (16, 18, 20) via respective high voltage cathode driver amplifiers (22, 24, 26) for display. The video signals each comprise a blanking signal component and a picture representative component. As illustrated in the inset sketch (at the output of driver amplifier 26) the blanking signal component of the video signal comprises a positive going pulse. The sketch at the grid of kinescope 20 illustrates the grid bias voltage which, in the normal operation of the system, is a positive voltage during trace intervals with a negative going pulse during horizontal blanking intervals. It will be noted that the grid blanking signal, in accordance with an aspect of the invention, is devoid of any picture representative component and is of opposite polarity to the blanking signal at the kinescope cathode.

Unit 34 also has an output 37 coupled to supply deflection (sweep) signals to the yokes (Y1, Y2, Y3) of the kinescopes. Unit 34 also has outputs (41, 43 and 39) for providing a horizontal blanking signal (HB), a vertical blanking signal (VB) and a scan loss indicating signal (SL), respectively. The scan loss indicating signal SL is produced by a detector (not shown) in unit 34 and provides an indication for use by a spot burn protection circuit 100 (described later) when the deflection (sweep) is collapsing during turn off of the system. Such detectors are known and may comprise, illustratively, detectors for directly monitoring the sweep signals or providing monitoring of low voltage supplies of the sweep circuitry.

Control of video processing and deflection unit 34 is provided by a control unit 36 that is coupled to unit 34 via a control bus 38. Unit 36 may comprise a micro-processor which may be of conventional design and may include a remote control unit for receiving user generated control signals and processing circuitry for sending signals via bus 38 to control various processing functions in unit 34 (e.g., channel selection, source selection, hue, tint and so forth). Control unit 36 also has an output 40 coupled to provide a run/standby control signal RS to a control input of a power supply 42. The supply 42 generates a relatively low voltage (LV) of a few tens of volts for operation of low voltage circuitry in a grid bias control circuit 50. It also generates a relatively high voltage (HV), on the order of two hundred volts or so, for operation of the kinescope driver amplifiers 22, 24 and 26 and for operation of a spot burn protection circuit (described later) in the grid bias control circuit 50.

The projection kinescopes 16, 18 and 20 each includes a respective control grid (G1a, G1b, G1c) provided with grid bias from a grid bias control circuit 50 (outlined in phantom) in accordance with the invention. The grid bias control circuit 50 provides a positive control grid bias (with supplementary re-trace blanking) to the grids of each kinescope during normal (run mode) operation of the system. Circuit 50 provides a high magnitude negative voltage to the grids for beam cut-off during a transition from the run operating mode to the standby mode thus providing spot burn protection.

In accordance with an aspect of the invention, the grid bias control circuit 50 includes circuitry that applies a blanking signal component, devoid of any picture representative component, to the control grids of the kinescopes via a circuit path including a spot burn protection circuit 100. This, and other features of the invention, will now be discussed in detail and specific circuitry for implementing the bias control circuit 50 will be described later in the discussion of FIG. 2.

Grid bias control circuit 50 (outlined in phantom), embodying the invention, comprises six circuits, namely, a composite blanking generator 60, a capacitor C1, a positive grid bias generator 80, a spot burn protection circuit 100, a grid coupling circuit 120 and a high frequency (HF) correction filter 140. In the following discussion these circuits will first be discussed individually and then the overall cooperative relationship will be described.

The composite blanking generator 60 is coupled to receive at inputs 62 and 64 the horizontal and vertical blanking signals (HB and VB) supplied to it from outputs 41 and 43 of processing unit 34. The generator 60 is of a special type in the present invention which does not "sandcastle" or "add" the blanking input signals HB and VB supplied to it from unit 34. Instead, generator 60 provides an "inclusive OR" gating function wherein the resultant output signal 1 assumes a given logic state if either or both of the blanking signals are present. For purposes of illustration and discussion, it will be assumed that the blanking signals are "high" when present and generator 60 provides a logical NOR operation so that the output signal S1, at output 66, is low (ground level) with either blanking signal is present, otherwise, the output signal S1 is high and equal to the value of the low voltage LV supplied to input 68 from supply 42. Desirably, generator 60 includes a buffer amplifier at its output to facilitate driving subsequent bias and correction circuits with a relatively low output impedance as discussed later. It will be noted that another form of logic may be used in generator 60 for the case where the blanking signals HB and VB are normally high and go low when the blanking signals are present (active low). For example, a AND gate will produce the desired low output signal if either or both of the blanking signals is low when present. The important point is that, regardless of the logic circuitry type, that the output signal S1 exhibit a transition from a positive voltage to a lower voltage whenever either of the blanking signals is present.

The output signal S1 of generator 60, it will be noted, is a "pure" blanking signal. In other words, it comprises only retrace blanking components and is devoid of any picture representative component. This feature of the invention facilitates subsequent modulation of bias for a spot burn correction circuit and pulse amplitude correction as will be explained.

The blanking signal S1, devoid of any picture representative component, is applied to a capacitor C1. The capacitor C1 "strips" (removes) the DC component from the output signal S1 of the composite blanking signal generator 60 so that the resultant blanking signal S2 at the capacitor output is devoid of both any picture representative component and any DC component. Advantageously, striping of the DC component of the blanking signal provided by generator 60 facilitates subsequent modulation of positive grid bias in a grid bias generator 80 without the need for relatively complex DC level shifting or scaling circuitry The grid bias generator 80 in the present invention is also of a special type. This generator has an input 82 for receiving low voltage power LV from supply 42 and an input 86 for receiving the modulation signal S2 from capacitor C1. Output 84 of generator 80 provides a reference voltage, Vr, which comprises a DC component provided by supply 42 and an AC component S2 of the composite blanking signal S1 provided by capacitor C1. During normal operation of the system, this modulated reference voltage Vr is coupled via the spot burn protection circuit 100 and a grid coupling circuit 120 to the grids of the kinescopes 16, 18 and 20.

The grid coupling circuit 120 couples the output 108 of spot burn protection circuit 100 provides capacitance loading of the grids G1a, G1b and G1c. Advantageously, a moderate amount of capacitance loading has been found helpful in preserving maximum bandwith for the display system. More specifically, in receiver/monitor applications the kinescope driver amplifiers 22, 24 and 26 should be of relatively wide bandwidth to provide maximum resolution. To this end it is desirable that the grids exhibit a relatively low impedance at high frequencies so that the grid voltage is stable and the grid to cathode voltage, during video trace intervals, is substantially equal the to the output voltages of the amplifiers.

Advantageously, capacitive grid loading provides the desired stability of the grid voltage during trace intervals. However, this loading may tend to distort the blanking signal pulse component of the modulated reference voltage Vr that is coupled to the grids via the spot burn protection circuit 100.

In accordance with a further feature of the invention, grid blanking pulse distortion is reduced by means of the high frequency correction filter 140. This filter receives the AC component S2 of the retrace blanking signal S1 produces an output signal S3 comprising high frequency components of signal S2. This high frequency correction signal (which facilitates capacitance loading of the grids) is applied to a circuit node N1 where it is summed with the output signal S4 of the spot burn protection circuit 100 for application to the input 122 of the grid coupling circuit 120.

FIGS. 3A–3C illustrates the effects of the HF correction circuit 140 on vertical grid blanking. In FIG. 3A waveform 310 shows the vertical blanking signal component provided by generator 60. Waveform 320 of FIG. 3B shows the vertical blanking signal as it would appear at the grids without high frequency correction. As shown, there is apparent smoothing of the features of the vertical blanking signal. Waveform 330 of FIG. 3C illustrates the restoration of the vertical blanking signal edges with correction by filter 140.

FIGS. 4A–4C illustrates the effects of the HF correction circuit 140 on horizontal grid blanking. In FIG. 4A waveform 410 shows the horizontal blanking signal component provided by generator 60. The high flat intervals HT 412 represent the horizontal trace period and the low intervals HB 414 represent the horizontal blanking signal waveform. Waveform 420 of FIG. 4B shows the horizontal blanking signal as it would appear at the grids without high frequency correction. As shown, there is apparent smoothing of the features of the horizontal blanking signal including both the trace interval HT 422 and the blanking interval HB 424. Waveform 430 of FIG. 4C illustrates the restoration of the horizontal blanking signal edges with correction by filter 140. As shown, the trace interval 432 and the blanking interval have been substantially restored to their original sharpness.

Spot burn protection circuit 100 serves dual functions in the present invention. During normal system operation when the scan loss indicating signal SL provided by unit 34 and applied to input 104 indicates normal scanning conditions, circuit 100 applies a positive grid bias voltage to the kinescope grids. Advantageously, in this mode the grid blanking signal S2, devoid of any picture component, is applied via the circuit path including spot burn protection circuit to the kinescope grids by modulation of the reference voltage Vr provided by generator 80. As shown by the inset grid voltage waveform diagram of FIG. 1, this voltage is positive during trace intervals and decreases during blanking intervals. Also, during normal operation (run mode) high voltage (HV) provided by supply 42 to input 106 is used to charge a capacitor in circuit 100 to a relatively high voltage (e.g., two hundred volts or so). During scan loss conditions, the scan loss signal SL at input 104 places circuit 100 in a protection mode in which the internal capacitor thereof is coupled to apply a high negative voltage on the kinescope grids thus cutting off the kinescope electron beams and protecting the kinescope from spot burns.

Figure 2:
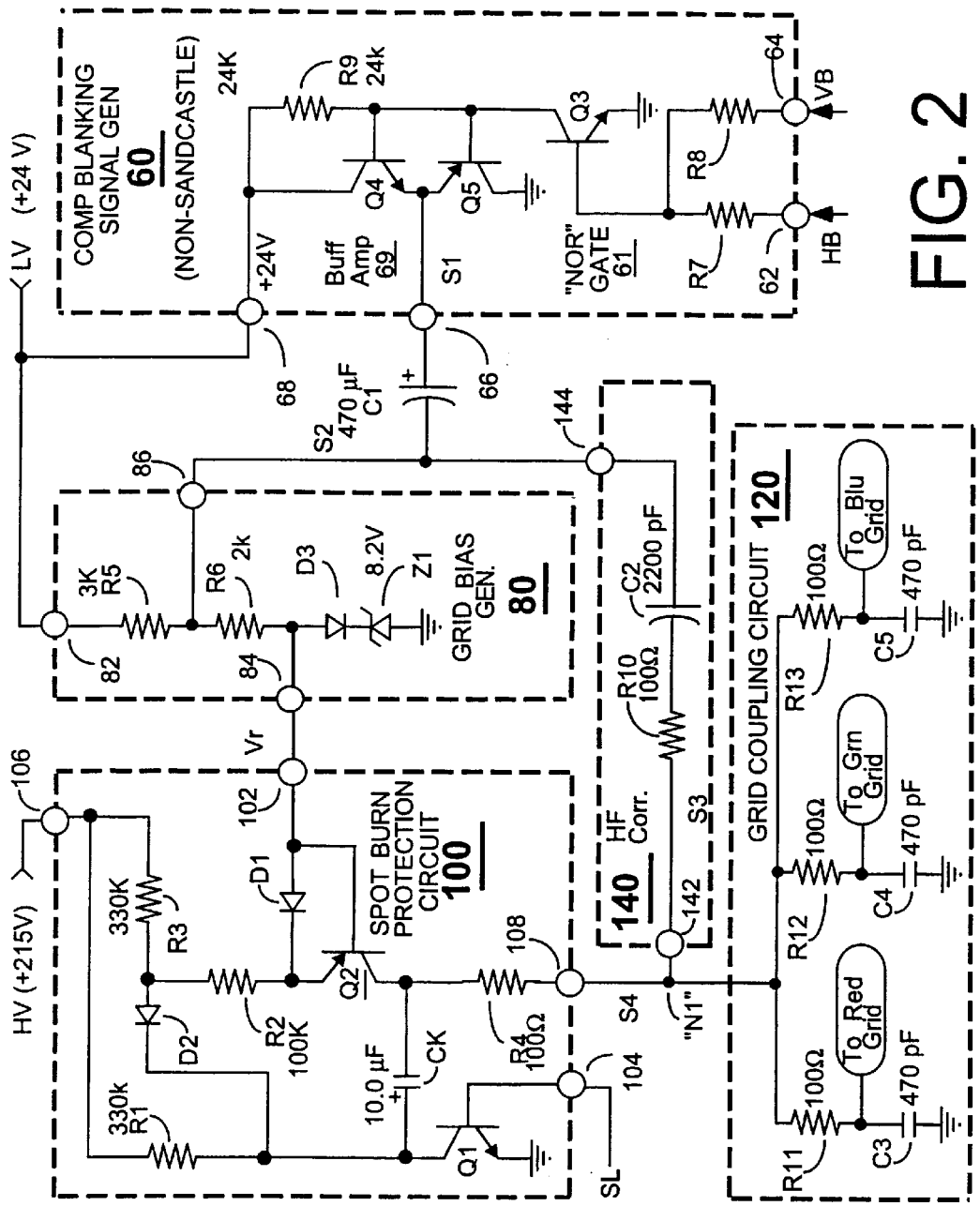
FIG. 2 is a detailed circuit diagram, with illustrative circuit element values, of the grid bias control circuit FIG. 1.

Protection circuit 100 utilizes what is commonly called the "grid kick" method of spot burn protection as previously discussed. In such a method, a charge storage device (e.g., a capacitor) is coupled to a control grid of the kinescope and is further coupled through a switching circuit to a relatively high voltage supply. As previously explained, the charge storage device is charged through the switching circuit by the high voltage supply during normal operation when scanning signals are present. Upon scan loss, the switching circuit decouples the supply voltage from the charge storage device and places a negative beam cut off voltage on the grid of the kinescope. In this manner, a sufficient voltage difference is maintained between the cathode and the control grid when the cathode voltage collapses to reduce the beam current to zero and thus the kinescope screen is protected for phosphor burn. An example of specific circuitry suitable for use in protection circuit 100 is shown in FIG. 2 and described later. It will be appreciated, however, that other spot burn protection circuits (as previously mentioned) may be used instead by appropriate circuit modifications.

FIG. 2 is a circuit diagram, with illustrative element values, of the grid bias control circuit 50 of FIG. 1. Like elements are denoted by like reference designators. The composite blanking signal generator 60, previously described with regard to its circuit functions, comprises a pair of resistors R7 and R8 that apply the horizontal blanking signal HB at terminal 62 and the vertical blanking signal VB at terminal 64 to the base of an NPN transistor Q3 having a load resistor R9 coupled to receive the low voltage LV from power supply 42. These elements function as a NOR gate (61) producing a low (ground) output signal at the collector of Q3 when either blanking signal is present and a high (+24 Volt) output signal otherwise. A buffer amplifier 69, comprising NPN transistor Q4 and PNP transistor Q5, connected to the collector of Q3 provides a relatively low output impedance at output 66 for driving grid bias generator 80 and high frequency correction filter 140.

The grid bias generator 80 comprises a series connection between supply terminal 82 and ground of a resistor R5, a further resistor R6, a diode D3 and a Zener diode Z1. The connection of resistors R5 and R6 is coupled to a modulation input terminal 86 which is coupled to receive the signal S2 from capacitor C1. The connection of resistor R6 and diode D3 is coupled to output 84 for supplying the modulated reference voltage Vr to the spot burn protection circuit 100. In operation Zener diode Z1 produces an output voltage during trace (active video) intervals of about 8.2 volts. When the blanking signal S2 goes low, there is no current for operating the Zener diode and so the reference voltage Vr goes to zero volts. In this way, the reference voltage for spot burn protection circuit 100 is modulated by the blanking signal S1.

The spot burn protection circuit 100 comprises a common emitter connected NPN transistor Q1 having a collector load resistor connected to supply terminal 106 for receiving a high voltage supply HV (e.g., 215 volts) from the power supply 42. The collector load resistor R1 is connected in parallel with a series connection of a resistor R3 and a diode D2. These elements remove operating current from a PNP switching transistor Q2 during scan loss as will be discussed. The transistor Q2 is coupled at the emitter thereof to the common connection of diode D2 and resistor R3 and is coupled via a diode D1 to the base of Q2 and to the input terminal 102 to which the modulated reference voltage Vr is applied. The collector of Q2 is coupled via a grid kick capacitor CK to the collector of transistor Q1 and is coupled to the protection circuit output terminal 108 via a current limiting resistor R4 having a relatively low value.

During normal operation (run mode), the scan loss signal SL is low and so transistor Q1 is off. During this time transistor Q2 is in saturation with emitter current supplied by resistor R2 which forward biases its base-emitter junction. Accordingly, the first (+) plate of capacitor CK receives charging current supplied from R1 and the other plate of capacitor is held to the relatively low voltage Vr. As a result, capacitor CK charges to a potential of about HV minus Vr (neglecting the saturation voltage of Q2 which is small). Also during this period, the blanking signal component of Vr is coupled via resistor R4 to the grids G1 a–G1 c via the grid coupling circuit 120.

During scan loss the scan loss signal goes high thus turning transistor Q1 on and thus clamping the positive plate of the grid kick capacitor CK to ground. Since the capacitor CK was charged during the normal or run mode of operation, a negative high voltage is produced at output 108. At the same time, diode D2 is forward biased thus removing operating current from transistor Q2. Concurrently, diode D1 is forward biased thus ensuring that transistor Q2 remains biased off.

The grid bias coupling circuit 120 comprises three resistors (R11, R12, R13) which couple the output of protection circuit 100 to respective ones of the Red, Green and Blue control grids which are each by passed to ground via respective capacitors C3, C4 and C5. As previouly explained,these capacitors are of modest size (a few hundred pico-Farads) and have been found to improve the overall high frequency response of the system. The distortion or smoothing caused by these capacitors is compensated for, as previouly explained, by the correction circuit 140 which comprises a series connection of a resistor 100 and a relatively larger capacitor C2 (of a few thousand pico-Farads). The series connection is coupled between capacitor C1 and the circuit node N1 and provides edge restoration of the grid blanking signals as previously discussed.

What is claimed is:

1. Television apparatus, comprising:
   a source coupled to provide a video signal to a cathode of a kinescope, coupled to provide a scanning signal to a yoke of the kinescope and having an output providing a scan loss indicating signal, the video signal including a picture representative component and a blanking signal component during a retrace interval;
   a spot burn protection circuit responsive to a first value of the scan loss indicating signal for applying a positive grid bias voltage to a grid of the kinescope and responsive to a second value of the scan loss indicating signal for applying a negative beam cut-off voltage to the grid; and circuit means for applying a blanking signal component during said retrace interval to the control grid of the kinescope via said spot burn protection circuit includes no picture representative component.

2. Apparatus as recited in claim 1, further comprising:

a blanking signal generator having an output providing said blanking signal component during said retrace interval; and capacitor means for AC coupling said blanking signal component to an input of said spot burn protection circuit via a reference voltage generator.

3. Apparatus as recited in claim 1, further comprising:

filter means for coupling a high frequency component of said blanking signal produced by said blanking signal generator to said control grid via a circuit path by-passing said spot burn protection circuit.

4. Apparatus as recited in claim 1, wherein said circuit means comprises:

gate means for generating said blanking signal component, said gate means having inputs coupled to receive a horizontal blanking signal and a vertical blanking signal from said source and having an output AC coupled to an input of said spot burn protection circuit.

5. Apparatus as recited in claim 1 wherein said circuit means comprises:

a blanking signal generator for producing said blanking signal during a trace interval;

a capacitor for stripping any DC component of the blanking signal produced by said blanking signal generator and for coupling the resultant blanking signal to a modulation input of a reference voltage generator to provide a modulated reference output voltage, Vr having a positive DC component and an AC blanking signal component; and means for applying said reference output voltage to a reference voltage input of said spot burn protection circuit.

6. Apparatus as recited in claim 1 wherein said circuit means comprises:

a blanking signal generator (60) for providing a retrace blanking output signal (S1) devoid of any picture representative component whenever a vertical blanking signal (VB) or a horizontal blanking signal (HB) are present;

a capacitor (C1) for removing DC from the blanking signal produced by said generator (60) and coupled to apply the resultant signal (S2) to a modulation input (84) of a grid bias generator (80) to produce an output grid bias reference voltage (Vr) modulated by the AC component of the blanking signal produced by the generator (60); and means coupling the reference voltage (Vr) via a spot burn protection circuit (100) and a grid coupling circuit (120) to respective control grids **(G1*a*, G1*b*, G1*c*) of a kinescope display means (16, 18, 20)**.

7. Apparatus as recited in claim 6, further comprising:

a high frequency correction circuit (140) coupled between an output (66) of the composite blanking generator (60) and an input (122) of the grid coupling circuit (120).

* * * * *